United States Patent [19]

Austin et al.

[11] 4,400,322

[45] Aug. 23, 1983

[54] DISPERSE MONOAZO DYESTUFFS

[75] Inventors: Peter W. Austin, Bury; Brian R. Fishwick, Cheadle, both of England

[73] Assignee: Imperial Chemical Industries Limited, London, England

[21] Appl. No.: 274,288

[22] Filed: Jun. 15, 1981

[30] Foreign Application Priority Data

Jul. 4, 1980 [GB] United Kingdom ................ 8022054

[51] Int. Cl.³ ............................................. C09B 29/00
[52] U.S. Cl. .................................. 260/205; 260/207.1
[58] Field of Search ............................. 260/205, 207.1

[56] References Cited

U.S. PATENT DOCUMENTS

| | | | |
|---|---|---|---|
| 4,192,800 | 3/1980 | Price et al. ........................... | 260/205 |
| 4,222,935 | 9/1980 | Greenall et al. ................. | 260/205 X |
| 4,237,048 | 12/1980 | Gottschlich et al. ........... | 260/205 X |

FOREIGN PATENT DOCUMENTS

| | | | |
|---|---|---|---|
| 50-97630 | 8/1975 | Japan ............................ | 260/205 UX |
| 760750 | 11/1956 | United Kingdom ......... | 260/205 UX |
| 794135 | 4/1958 | United Kingdom ......... | 260/205 UX |
| 1059119 | 2/1967 | United Kingdom ......... | 260/205 UX |
| 1119326 | 7/1968 | United Kingdom ......... | 260/205 UX |
| 1201590 | 8/1970 | United Kingdom ......... | 260/205 UX |

OTHER PUBLICATIONS

"J. Chem. Soc. Perkin I", 1976, pp. 42–45.

*Primary Examiner*—Paul F. Shaver
*Attorney, Agent, or Firm*—Cushman, Darby & Cushman

[57] ABSTRACT

Disperse monoazo dyestuffs from 2,3-, 3,4- or 2,5-dicyanoanilines as diazo components and N,N-dialk(en)yl-anilines having an acylamino or alkoxycarbonyl group in the 3-position as coupling components. The dyestuffs give red shades on synthetic textile materials.

3 Claims, No Drawings

DISPERSE MONOAZO DYESTUFFS

This invention relates to disperse monoazo dyestuffs derived from dicyanoaniline diazo components, to a process for their preparation and to their use for colouring synthetic textile materials.

Certain disperse monoazo dyestuffs derived from dicyanoaniline diazo components are known, for example, from U.K. Patent Specification Nos. 760750, 794135, 1059119, 1119326 and 1201590, and from J. Chem. Soc. Perkin I, 1976, 42-45.

According to the present invention there are provided disperse monoazo dyestuffs having the general formula (I):

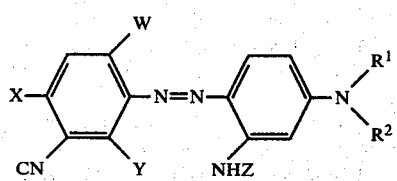

wherein
one of W, X and Y is cyano and the others are hydrogen,
Z is —COR, —SO$_2$R or —CO$_2$R, in which R is optionally substituted alkyl or optionally substituted aryl,
R$^1$ is hydrogen, alkyl of 1 to 8 carbon atoms or alkenyl of 3 to 8 carbon atoms, and
R$^2$ is alkyl of 1 to 8 carbon atoms or alkenyl of 3 to 8 carbon atoms.

The optionally substituted alkyl radicals represented by R preferably contain from 1 to 4 carbon atoms, for example methyl, ethyl, n-propyl, isopropyl, n-butyl and β-chloroethyl.

The optionally substituted aryl radicals represented by R are preferably optionally substituted phenyl radicals, for example tolyl, anisyl, chloro- or bromo-phenyl or nitrophenyl.

Examples of the alkyl radicals of 1 to 8 carbon atoms represented by R$^1$ and R$^2$ are methyl, ethyl, n-propyl, isopropyl, n-butyl, 2-ethylhexyl and n-octyl.

Examples of alkenyl radicals of 3 to 8 carbon atoms represented by R$^1$ and R$^2$ are allyl and γ,γ-dimethylallyl.

According to a further feature of the invention there is provided a process for the preparation of the dyestuffs of formula (I) defined above which comprises diazotising an amine of formula (II):

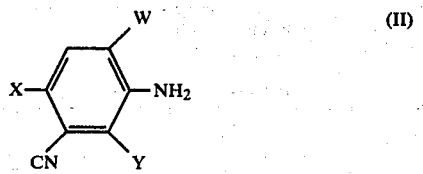

and coupling the diazonium compound so obtained with a coupling component of formula (III):

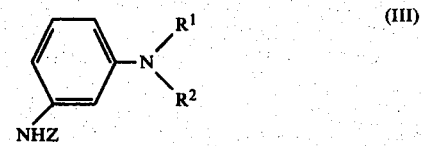

wherein R$^1$, R$^2$, W, X, Y and Z have the previously defined meanings.

The amines of formula (II) which may be used are 3,4-dicyanoaniline, 2,3-dicyanoaniline and 2,5-dicyanoaniline.

Examples of the coupling components of formula (III) which may be used are N,N-diethyl-m-aminoacetanilide, N,N-di-n-(or iso-)propyl-m-aminoacetanilide, N,N-di-(n-pentyl)-m-aminoacetanilide, N,N-dimethyl-m-aminoacetanilide, m-(methoxycarbonylamino)-N,N-diethylaniline, m-(methylsulphonylamino)-N,N-diethylaniline, and m-benzoylamino-N,N-diethylaniline.

The diazotisation and coupling may be carried out by known methods for these reactions. For example, the process may be carried out by adding sodium nitrite to a solution or dispersion of the arylamine in sulphuric acid, an aqueous solution thereof or a mixture of sulphuric acid with an organic acid such as acetic and/or propionic acid, or by stirring the arylamine with nitrosylsulphuric acid, followed by addition of the resulting solution or dispersion of the diazonium compound to a solution of the coupling component in water or in a mixture of water and a water-miscible organic liquid, if necessary adjusting the pH of the mixture to facilitate the coupling reaction, and finally isolating the resulting dyestuff by conventional methods.

The dyestuffs of the present invention may be applied to synthetic textile materials by dyeing, padding or printing methods in the form of aqueous dispersions which are prepared by conventional methods, for example, by milling the dyestuffs with water and a suitable dispersing agent such as the sodium salt of a naphthalene-2-sulphonic acid/formaldehyde condensate.

Examples of synthetic textile materials to which the dyestuffs of the present invention may be applied are textile materials fabricated from secondary cellulose acetate, cellulose triacetate, polyamides such as poly(hexamethylene adipamide) and above all aromatic polyesters such as polyethylene terephthalate.

The dyestuffs may also be applied to synthetic textile materials by known methods of transfer colour printing such as sublimation transfer printing, optionally under reduced pressure, and wet transfer printing.

The dyestuffs also find application for the melt colouration of polymers such as aromatic polyesters.

When applied to synthetic textile materials as indicated above, the dyestuffs of the present invention provide red shades having good fastness to the tests conventionally applied to coloured synthetic textile materials, and in particular good fastness to dry heat setting (sublimation fastness).

This invention is illustrated by the following Examples in which parts and percentages are by weight.

EXAMPLE 1

1.4 Parts of 4-aminophthalonitrile are stirred with 40 parts of acetic acid at 25° C. for 20 minutes. 10 Parts of hydrochloric acid (s.g.=1.18) are added and the solution is stirred at 0°-5° C. while 5.2 parts of 2 N sodium nitrite solution are added dropwise. The solution is stirred for a further hour at 0°-5° C. and the excess nitrous acid is destroyed by the addition of a few drops of a 10% aqueous solution of sulphamic acid.

Meanwhile 2.2 parts of N,N-diethyl-m-aminoacetanilide are heated to 80° C. with 25 parts of acetic acid. The solution so obtained is allowed to cool to room temperature and then added to a stirred mixture of 200 parts of water and 100 parts of ice. The diazonium salt solution is then added and the mixture is stirred at 0°-5° C. for 4 hours, after which it is allowed to warm up to room temperature. The product is collected by filtration, washed with 300 parts of cold water and dried. There are obtained 3.2 parts (89%) of 4-(3,4-dicyanophenylazo)-3-acetylamino-N,N-diethylaniline. Recrystallisation from propan-1-ol affords long needles, m.p. 181°-182° C., having λmax (acetone) 515 nm.

When applied in the form of an aqueous dispersion to polyester fibres the dyestuff colours the fibres in bright red shades having good fastness to wet treatments and to light.

Further examples of dyestuffs according to the invention are given in the following table, in which W, X, Y, Z, $R^1$ and $R^2$ have the meanings and positions assigned to these symbols in general formula (I). The dyestuffs are prepared by diazotisation and coupling techniques essentially as described in Example 1. All of the dyestuffs give red shades when applied in the form of aqueous dispersions to aromatic polyester textile material.

EXAMPLE 16

The 1.4 parts of 4-aminophthalonitrile used in Example 1 are replaced by a mixture of 1.1 parts of 4-aminophthalonitrile and 0.3 parts of 3-aminophthalonitrile to give a dyestuff that yielded substantially similar shades on polyester to the dyestuff of Example 1.

We claim:

1. Disperse monoazo dyestuffs having the general formula (I)

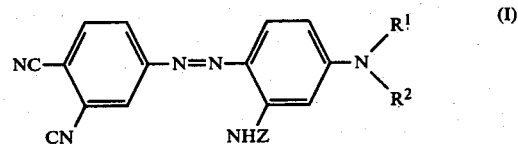

wherein
Z is —COR, —SO$_2$R or —CO$_2$R, in which R is optionally substituted alkyl, or optionally substituted aryl,
$R^1$ is hydrogen, alkyl of 1 to 8 carbon atoms or alkenyl of 3 to 8 carbon atoms, and
$R^2$ is alkyl of 1 to 8 carbon atoms or alkenyl of 3 to 8 carbon atoms.

2. Dyestuffs as claimed in claim 1 wherein the optionally substituted alkyl radicals represented by R contain from 1 to 4 carbon atoms.

3. Dyestuffs as claimed in claim 1 wherein the optionally substituted aryl radicals represented by R are optionally substituted phenyl radicals.

* * * * *

| Example | W | X | Y | Z | $R^1$ | $R^2$ | m.p. (°C.) | Recrystallisation Solvent | λmax |
|---|---|---|---|---|---|---|---|---|---|
| 2 | CN | H | H | COCH$_3$ | C$_2$H$_5$ | C$_2$H$_5$ | 165–167 | ethanol | 507 nm |
| 3 | H | H | CN | " | " | " | 173–175 | CH$_2$Cl$_2$/ethanol | 506 nm |
| 4 | " | CN | H | " | C$_3$H$_7$(n) | C$_3$H$_7$(n) | 178–180 | acetone | 516 nm |
| 5 | " | " | " | " | C$_4$H$_9$(n) | C$_4$H$_9$(n) | 147 | ethanol | 518 nm |
| 6 | " | " | " | SO$_2$CH$_3$ | C$_3$H$_7$(n) | C$_3$H$_7$(n) | 219–222 | n-propanol | 507 nm |
| 7 | " | " | " | COC$_6$H$_5$ | C$_2$H$_5$ | C$_2$H$_5$ | 165–168 | " | 512 nm |
| 8 | " | " | " | COCH$_3$ | CH$_2$CH=CH$_2$ | CH(CH$_3$)$_2$ | 148–150 | ethanol | 507 nm |
| 9 | " | " | " | " | " | CH$_2$CH=CH$_2$ | 122–124 | " | 502 nm |
| 10 | " | " | " | " | H | CH(CH$_3$)(CH$_2$)$_3$CH$_3$ | 138–140 | CH$_2$Cl$_2$/petroleum ether | 503 nm |
| 11 | " | " | " | CO—C$_6$H$_4$—NO$_2$ | C$_2$H$_5$ | C$_2$H$_5$ | 132–134 | ethoxyethanol | 513 nm |
| 12 | " | " | " | CO$_2$C$_2$H$_5$ | " | " | 121–123 | ethanol | 509 nm |
| 13 | " | " | " | COC$_2$H$_5$ | " | " | 188–189 | " | 511 nm |
| 14 | " | " | " | COCH$_3$ | H | CH(CH$_3$)(CH$_2$)$_5$CH$_3$ | Amorphous solid when triturated with light petroleum | | 502 nm |
| 15 | " | " | " | COCH$_2$CH$_2$Cl | C$_2$H$_5$ | C$_2$H$_5$ | 167–169 | n-propanol | 510 nm |